US012646811B2

(12) United States Patent
Ding et al.

(10) Patent No.: US 12,646,811 B2
(45) Date of Patent: Jun. 2, 2026

(54) ADJUSTABLE PHASE SHIFTER AND MANUFACTURING METHOD THEREFOR, AND ELECTRONIC DEVICE

(71) Applicants: Beijing BOE Sensor Technology Co., Ltd., Beijing (CN); BOE Technology Group Co., Ltd., Beijing (CN)

(72) Inventors: Yi Ding, Beijing (CN); Yifeng Qin, Beijing (CN); Hailong Lian, Beijing (CN); Haocheng Jia, Beijing (CN); Feng Qu, Beijing (CN); Chuncheng Che, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 119 days.

(21) Appl. No.: 18/696,761

(22) PCT Filed: Aug. 26, 2022

(86) PCT No.: PCT/CN2022/115304
§ 371 (c)(1),
(2) Date: Mar. 28, 2024

(87) PCT Pub. No.: WO2024/040616
PCT Pub. Date: Feb. 29, 2024

(65) Prior Publication Data
US 2024/0413511 A1 Dec. 12, 2024

(51) Int. Cl.
*H01P 1/18* (2006.01)
*H01P 11/00* (2006.01)

(52) U.S. Cl.
CPC .............. *H01P 1/182* (2013.01); *H01P 11/00* (2013.01)

(58) Field of Classification Search
CPC ............. H01P 1/182; H01P 11/00; H01P 1/18
See application file for complete search history.

(56) References Cited

FOREIGN PATENT DOCUMENTS

| | | | | |
|---|---|---|---|---|
| CN | 107994302 A * | 5/2018 | | H01P 1/18 |
| CN | 108710232 A | 10/2018 | | |
| CN | 108711669 A | 10/2018 | | |
| CN | 109818150 A | 5/2019 | | |
| CN | 209544616 U | 10/2019 | | |
| CN | 110658646 A | 1/2020 | | |
| CN | 110943299 A | 3/2020 | | |
| CN | 111180209 A | 5/2020 | | |
| CN | 114079159 A | 2/2022 | | |
| EP | 3664215 A1 | 6/2020 | | |
| EP | 3745526 A1 | 12/2020 | | |
| WO | WO-2019088542 A1 * | 5/2019 | | H01P 1/184 |

* cited by examiner

*Primary Examiner* — Andrea Lindgren Baltzell
*Assistant Examiner* — Kimberly E Glenn
(74) *Attorney, Agent, or Firm* — Workman Nydegger

(57) ABSTRACT

An adjustable phase shifter and a manufacturing method therefor, and an electronic device. The adjustable phase shifter includes: a first substrate and a second substrate, which are arranged opposite each other; an adjustable dielectric layer, which is arranged between the first substrate and the second substrate; a first electrode, which is located on the side of the first substrate facing the adjustable dielectric layer; and a second electrode, which is located on the side of the second substrate facing the adjustable dielectric layer, wherein an adjustable capacitor is formed in an overlap region between the first electrode and the second electrode.

14 Claims, 15 Drawing Sheets

ADJUSTABLE PHASE SHIFTER AND MANUFACTURING METHOD THEREFOR, AND ELECTRONIC DEVICE

CROSS REFERENCE TO RELATED APPLICATIONS

The present disclosure is a US National Stage of International Application No. PCT/CN2022/115304, filed on Aug. 26, 2022, the entire contents of which are incorporated herein by reference.

TECHNICAL FIELD

The disclosure relates to the field of communication technology, in particular to a tunable phase shifter and a manufacturing method therefor, and an electronic device.

BACKGROUND

Benefiting from advances in new materials, new processes, and algorithms, phase shifters have gradually demonstrated unique advantages such as compact structure, low cost, and reconfigurability, leading to widespread applications. For liquid crystal phase shifters, periodic introduction of liquid crystal capacitors can adjust the dielectric constant of the liquid crystal layer by controlling the liquid crystal orientation, thereby adjusting the total capacitance of the unit length branch and achieving the phase shift. Improving the phase-shifting performance of phase shifters has become a pressing technical challenge.

SUMMARY

Embodiments of the disclosure provide a tunable phase shifter and a manufacturing method therefor, and an electronic device. Specific solutions are as follows.

Embodiments of the disclosure provide a tunable phase shifter, including: a first substrate and a second substrate arranged opposite to each other; a variable dielectric layer between the first substrate and the second substrate; a first electrode on a side of the first substrate facing the variable dielectric layer; and a second electrode on a side of the second substrate facing the variable dielectric layer, where an overlapping area of the first electrode and the second electrode forms a variable capacitor. In a direction facing away from the first substrate, a sectional area of the first electrode along a plane parallel to a plane of the first substrate decreases; and in a direction facing away from the second substrate, a sectional area of the second electrode along a plane parallel to a plane of the second substrate decreases.

Optionally, in the embodiments of the disclosure, a sectional shape of each of the first electrode and the second electrode along a corresponding thickness direction is trapezoidal, and a length of a bottom edge of the sectional shape in contact with a corresponding substrate is larger than a length of a top edge of the sectional shape.

Optionally, in the embodiments of the disclosure, angles of two side edges to the bottom edge of the sectional shape of at least one of the first electrode and the second electrode along the corresponding thickness direction are same.

Optionally, in the embodiments of the disclosure, a range of the angles is (0°, 90°).

Optionally, in the embodiments of the disclosure, a side edge of a sectional shape of each of the first electrode and the second electrode along a corresponding thickness direction is arc-shaped and is concave toward a central position of the sectional shape.

Optionally, in the embodiments of the disclosure, the sectional shape of each of the first electrode and the second electrode along the corresponding thickness direction has a chamfer between the side edge and a top edge of the sectional shape.

Optionally, in the embodiments of the disclosure, a capacitance value of the variable capacitor is given by:

$$C_1 = \frac{\varepsilon_0 \varepsilon_r \times L \times (L_1 + L_2')/2}{(D_1 + D_2)/2};$$

where, $C_1$ indicates the capacitance value of the variable capacitor; $\varepsilon_0$ indicates a vacuum dielectric constant; $\varepsilon_r$ indicates a relative dielectric constant; L indicates an extension length of the first electrode and the second electrode; $L_1$ indicates a length of the top edge of the sectional shape of the first electrode and the second electrode along the corresponding thickness direction; $L_2'$ indicates a length of the bottom edge of the sectional shape of the first electrode and the second electrode along the corresponding thickness direction; $D_1$ indicates a distance between the top edge of the sectional shape of the first electrode along the corresponding thickness direction and the top edge of the sectional shape of the second electrode along the corresponding thickness direction in the overlapping area; and $D_2$ indicates a distance between the bottom edge of the sectional shape of the first electrode along the corresponding thickness direction and the bottom edge of the sectional shape of the second electrode along the corresponding thickness direction in the overlapping area.

Optionally, in the embodiments of the disclosure, the first electrode includes a first signal electrode and a second signal electrode spaced from each other, and the second electrode includes a first patch electrode attached to a side of the second substrate facing the variable dielectric layer. Orthographic projections of the first signal electrode and the second signal electrode on the first substrate both at least partially overlap with an orthographic projection of the first patch electrode on the first substrate, forming the variable capacitor.

Optionally, in the embodiments of the disclosure, the first electrode includes a first body part extending along a first direction and multiple first branch parts connected with the first body part and extending along a second direction intersecting the first direction; and the second electrode includes a second body part extending along the first direction and multiple second branch parts connected with the second body part and extending along the second direction. The first branch parts at least partially overlap with corresponding second branch parts, forming the variable capacitor.

Optionally, in the embodiments of the disclosure, the first electrode includes multiple first grounding electrodes arranged at intervals. Each of the first grounding electrodes is coupled to a second grounding electrode on a side of the first substrate facing away from the variable dielectric layer via a through hole penetrating through the first substrate in a thickness direction of the first substrate. An orthographic projection of each of the first grounding electrodes on the first substrate falls completely within a range of an orthographic projection of the second grounding electrode on the first substrate. The orthographic projection of each of the first grounding electrodes on the first substrate at least partially overlaps with an orthographic projection of the first patch electrode on the first substrate, forming the variable capacitor.

Optionally, in the embodiments of the disclosure, the first electrode includes multiple third grounding electrodes arranged at intervals and a third signal electrode between adjacent third grounding electrodes; and the second electrode includes multiple second patch electrodes arranged at intervals. Orthographic projections of each of the third grounding electrodes and the third signal electrode on the first substrate at least partially overlap with an orthographic projection of a corresponding second patch electrode on the first substrate, forming the variable capacitor.

Optionally, in the embodiments of the disclosure, the first electrode includes a fourth grounding electrode and a fourth signal electrode, where the fourth grounding electrode includes a first sub-grounding electrode and a second sub-grounding electrode spaced from each other; the fourth signal electrode is located between the first sub-grounding electrode and the second sub-grounding electrode; and the second electrode includes multiple third patch electrodes arranged at intervals. The fourth signal electrode includes a third body part extending along a third direction and multiple third branch parts connected with the third body part and extending along a fourth direction intersecting the third direction. The first sub-grounding electrode includes a fourth body part extending along the third direction and multiple fourth branch parts connected with the fourth body part and extending along the fourth direction. The second sub-grounding electrode includes a fifth body part extending along the third direction and multiple fifth branch parts connected with the fifth body part and extending along the fourth direction. An orthographic projection of each of the third patch electrodes on the first substrate at least partially overlaps with orthographic projections of corresponding third branch parts, fourth branch parts, and fifth branch parts on the first substrate, forming the variable capacitor.

Optionally, in the embodiments of the disclosure, the first electrode includes multiple fifth grounding electrodes arranged at intervals and a fifth signal electrode between adjacent fifth grounding electrodes; and the second electrode includes a fourth patch electrode attached to the side of the second substrate facing the variable dielectric layer. Orthographic projections of each of the fifth grounding electrodes and the fifth signal electrode on the first substrate at least partially overlap with an orthographic projection of the fourth patch electrode on the first substrate, forming the variable capacitor.

Correspondingly, embodiments of the disclosure further provide an electronic device, and the electronic device includes: the tunable phase shifter according to any one of the above embodiments, a radiating antenna, a power divider network, and a feeding network arranged in an array.

Correspondingly, embodiments of the disclosure further provide a method of manufacturing the tunable phase shifter according to any of the above embodiments. The method includes: forming a pattern of the first electrode on a side of the first substrate and forming a pattern of the second electrode on a side of the second substrate, via an electroplating process; and forming the variable dielectric layer between the first substrate and the second substrate in such a way that the overlapping area of the first electrode and the second electrode forms the variable capacitor.

Optionally, in the embodiments of the disclosure, the forming the pattern of the first electrode on the side of the first substrate via the electroplating process, includes depositing a first seed layer on the side of the first substrate across the entire side; forming a first metal film layer on a side of the first seed layer away from the first substrate across the entire side via the electroplating process; and forming the pattern of the first electrode by etching the first seed layer and the first metal film layer via a patterning process.

Optionally, in the embodiments of the disclosure, the forming the pattern of the second electrode on the side of the second substrate via the electroplating process, includes: depositing a second seed layer on the side of the second substrate across the entire side; forming a second metal film layer on a side of the second seed layer away from the second substrate across the entire side via the electroplating process; and forming the pattern of the second electrode by etching the second seed layer and the second metal film layer via a patterning process.

DETAILED DESCRIPTION

In order to make objectives, technical solutions and advantages of the embodiments of the disclosure clearer, the technical solutions of the embodiments of the disclosure are described clearly and completely below with reference to the drawings of the embodiments of the disclosure. Apparently, the described embodiments are some, not all, of the embodiments of the disclosure. The embodiments in the disclosure and the features in the embodiments may be combined with each other without conflict. Based on the described embodiments of the disclosure, all other embodiments obtained by those of ordinary skill in the art without inventive efforts fall within the protection scope of the disclosure.

Unless otherwise indicated, the technical or scientific terms used in the disclosure shall have the usual meanings understood by a person of ordinary skill in the art to which the disclosure belongs. The word "including" or "comprising" and the like in the disclosure, means that an element or item preceding the word covers an element or item listed after the word and the equivalent thereof, without excluding other elements or items.

According to the capacitance calculation formula, inventor(s) of the present invention found in actual research that the spacing of an overlapping capacitor between the upper and lower substrates has a crucial impact on the performance of the phase shifter. Combined with relevant film layer structures, transmission lines, and thickness uniformity of metal capacitor pieces of overlapping branches, they all have a decisive impact on the device performance.

Figure 1:
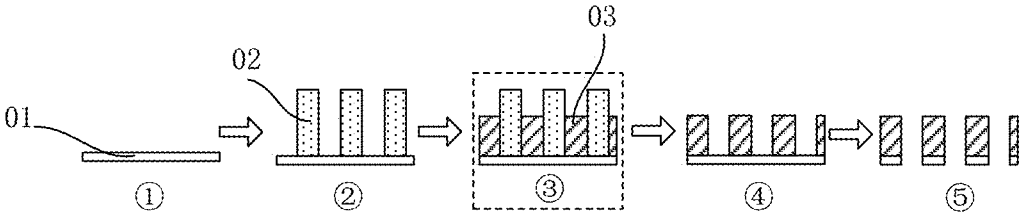
FIG. 1 is a process flow chart corresponding to one of traditional electroplating schemes.

Currently, a metal film layer on a glass substrate needs to be manufactured by electroplating to meet requirements of thickness for the skin depth. In practical applications, a thickness of the metal film layer corresponding to the transmission line or electrode in the liquid crystal phase shifter is often relatively large, usually above 2 μm. One of process flows corresponding to the traditional electroplating scheme is shown in FIG. 1. The electroplating process flow mainly includes five steps ①~⑥. In step ①: a seed layer 01 is formed by correspondingly depositing the seed layer. In step ②: a thick photoresist (PR) is exposed, which can include first forming a thick PR layer 02, and a thickness of the PR layer 02 increasing with an increase of required copper (Cu) thickness, and patterning the PR layer 02 to form the pattern of the required PR layer. In step ③: thick Cu is electroplated, which can include electroplating thick Cu 03 according to the pattern of the PR layer 02. In step ④: the thick PR is stripped, which can include stripping off the pattern of the PR layer 02. In step ⑤: the seed layer is etched, which can include etching the seed layer 01 to form the pattern of the required Cu layer. Since a thick PR layer 02 needs to be formed before the thick Cu electroplating, this puts a high requirement on material and manufacturing process for the PR layer 02, so that mass production cannot be guaranteed. Moreover, due to the characteristics of the electroplating process, such as current concentration, when patterned electroplating is performed, the uniformity of the film layer thickness is poor. In addition, due to the close correlation between the thickness of the metal film layer and the shape and distribution of the electroplating pattern on the substrate, the uniformity and controllability of electroplating are poor, resulting in a low uniformity ranging from 33% to 150% of the designed metal film layer thickness, thereby reducing the phase-shifting performance of the phase shifter.

In view of the above, embodiments of the disclosure provide a tunable phase shifter, a method of manufacturing the tunable phase shifter, and an electronic device, to ensure the uniformity of the metal film thickness and improve the phase-shifting performance of the phase shifter.

Figure 2:
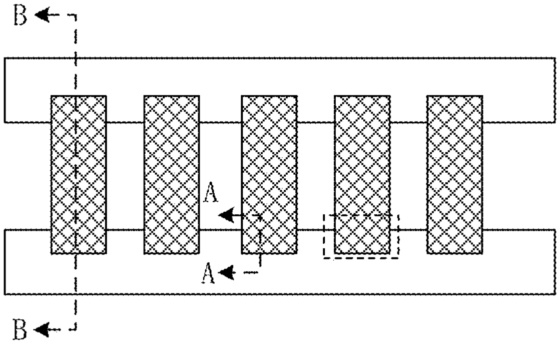
FIG. 2 is a partial top view of a tunable phase shifter provided in embodiments of the disclosure.
Figure 3:
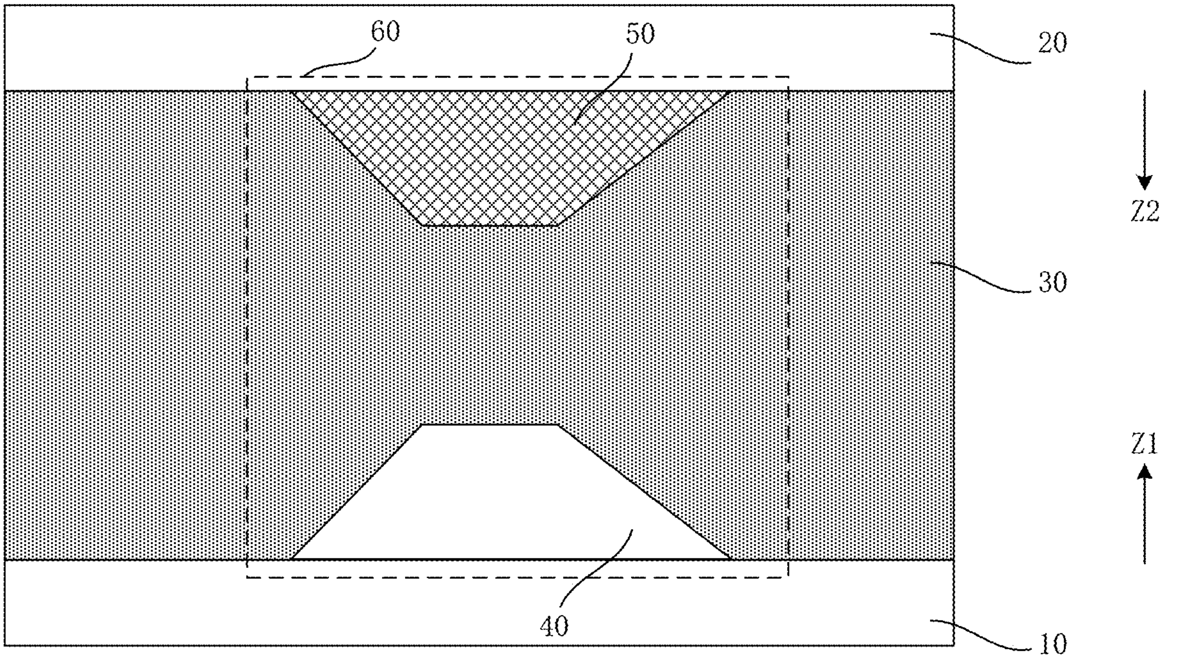
FIG. 3 is sectional view taken along the direction AA shown in FIG. 2.

Referring to FIGS. 2 and 3, embodiments of the disclosure provide a tunable phase shifter. FIG. 2 is a partial top view of the tunable phase shifter, and FIG. 3 is a sectional view taken along the direction AA in FIG. 2. Specifically, the tunable phase shifter includes:

- a first substrate 10 and a second substrate 20 arranged opposite to each other;
- an variable dielectric layer 30 between the first substrate 10 and the second substrate 20;
- a first electrode 40 on a side of the first substrate 10 facing the variable dielectric layer 30;
- a second electrode 50 on a side of the second substrate 20 facing the variable dielectric layer 30; here, an overlapping area of the first electrode 40 and the second electrode 50 forms a variable capacitor 60;
- where, in a direction facing away from the first substrate 10, a sectional area of the first electrode 40 along a plane parallel to a plane of the first substrate 10 decreases; and in a direction facing away from the second substrate 20, a sectional area of the second electrode 50 along a plane parallel to a plane of the second substrate 20 decreases.

In specific implementations, the tunable phase shifter provided in the embodiments includes the first substrate 10 and the second substrate 20 arranged opposite to each other, and the first substrate 10 and the second substrate 20 can be glass substrates, polyimide (PI), or liquid crystal polymer (LCP). Additionally, the first substrate 10 and the second substrate 20 can be set according to actual application needs.

The tunable phase shifter provided in the embodiments of the disclosure further includes the variable dielectric layer 30 between the first substrate 10 and the second substrate 20. In an exemplary embodiment, the variable dielectric layer 30 can be a liquid crystal layer, and the corresponding tunable phase shifter can be a liquid crystal phase shifter. The liquid crystal molecules in the liquid crystal layer can be positive liquid crystal molecules or negative liquid crystal molecules, without limitation. Moreover, the tunable phase shifter also includes the first electrode 40 on the side of the first substrate 10 facing the variable dielectric layer 30 and the second electrode 50 on the side of the second substrate 20 facing the variable dielectric layer 30. In an exemplary embodiment, the first electrode 40 may be arranged on a surface of the side of the first substrate 10 facing the variable dielectric layer 30, and the second electrode 50 may be arranged on a surface of the side of the second substrate 20 facing the variable dielectric layer 30. The materials of the first electrode 40 and the second electrode 50 can be the same or different. For example, the material of the first electrode 40 may be indium tin oxide (ITO), copper (Cu), or silver (Ag), etc., and the material of the second electrode 50 may be ITO, Cu, or Ag, etc. Different materials have different conductivities and different losses, and in practice, the materials of the first electrode 40 and the second electrode 50 can be selected based on the requirements of phase shift degrees of the tunable phase shifter, which is not limited here.

In specific implementations, the overlapping area of the first electrode 40 and the second electrode 50 forms a variable capacitor 60. In an exemplary embodiment, there can be multiple first electrodes 40 and multiple second electrodes 50, and correspondingly, there can be multiple variable capacitors 60. In the case that the variable dielectric layer 30 is a liquid crystal layer, different voltages are applied to the first electrode 40 and the second electrode 50 corresponding to the corresponding variable capacitors 60, to generate a vertical electric field between them and drive the liquid crystal molecules in the liquid crystal layer to deflect, thereby changing the dielectric constant of the liquid crystal layer and adjusting the phase shift of the tunable phase shifter.

Still referring to FIG. 3, in the direction facing away from the first substrate 10, the sectional area of the first electrode 40 along the plane parallel to the plane of the first substrate 10, shows a decreasing trend. Here, the direction facing away from the first substrate 10 can be as shown by Z1 in FIG. 3. Moreover, in the direction facing away from the second substrate 20, the sectional area of the second electrode 50 along the plane parallel to the plane of the second substrate 20, shows a decreasing trend. Here, the direction facing away from the second substrate 20 can be as shown by Z2 in FIG. 3. The decreasing sectional areas of the first electrode 40 and the second electrode 50 provide a possibility of depositing a metal film layer of the required thickness over the entire surface during the electroplating process. In the actual application process, a method of electroplating copper over the entire surface can be initially employed to eliminate an impact of patterning on the uniformity of electroplating. Then, a desired metal pattern is covered and protected with a PR (photoresist). The unprotected portion is etched away using an etchant, forming the final required metal pattern. Finally, the PR is peeled off. This entire process not only enhances the uniformity and controllability of electroplating but also reduces process complexity, thereby ensuring the uniformity of the metal film layer thickness and improving the phase-shifting performance of the tunable phase shifter.

Figure 4:
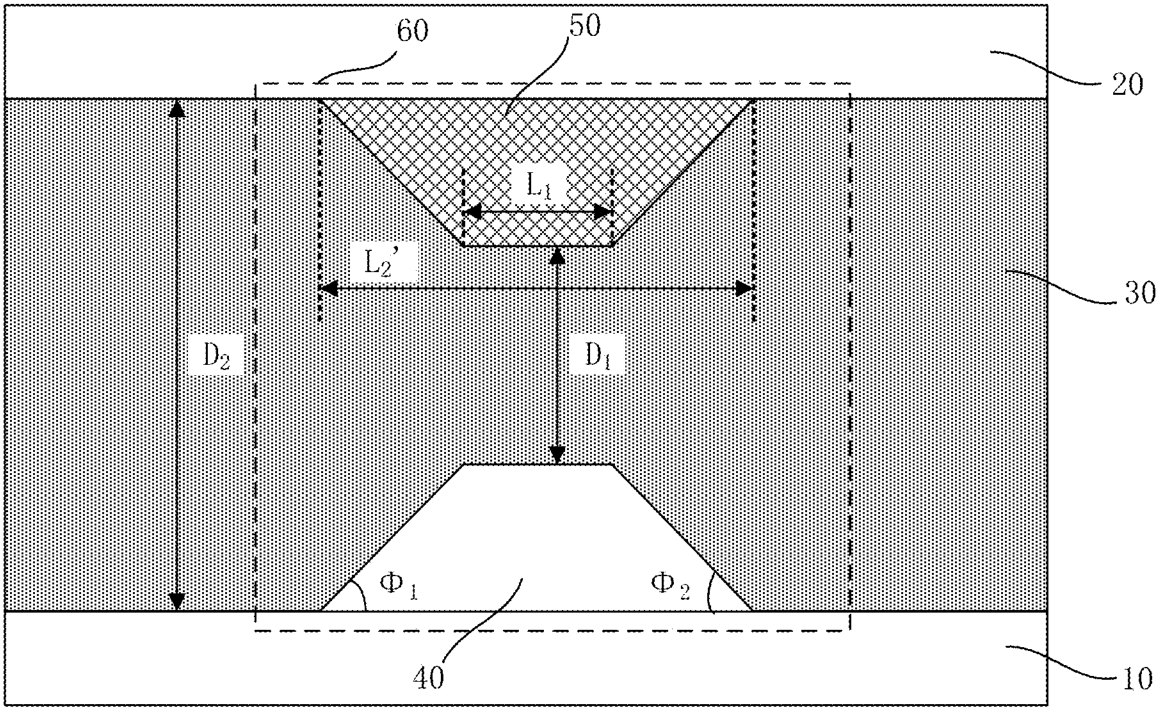
FIG. 4 is sectional view taken along the direction AA shown in FIG. 2.

In an exemplary embodiment of the disclosure, as shown in FIG. 4 which a sectional view taken along the direction AA of FIG. 2, sectional shapes of the first electrode 40 and the second electrode 50 in the respective thickness directions are trapezoidal. For one sectional shape, a length of a bottom edge in contact with the substrate corresponding to the sectional shape is greater than a length of a top edge.

Still referring to FIG. 4, the first electrode 40 and the second electrode 50 have trapezoidal sectional shapes along the respective thickness directions. The first electrode 40 and the second electrode 50 can be symmetrically designed, and the length of the bottom edge in contact with the substrate corresponding to the sectional shape is greater than the length of the top edge. As shown in FIG. 4, the length of the bottom edge is L2', and the length of the top edge is L1, where L2'>L1. In an exemplary embodiment, the trapezoid can be a regular shape (as shown in FIG. 4) or a non-regular shape, which is not limited here. In this way, the trapezoidal sectional shapes of the first electrode 40 and the second electrode 50 provide the possibility of depositing a metal film layer of the required thickness over the entire surface during the electroplating process. This ensures the uniformity of the metal film layer thickness, enhancing the phase-shifting performance of the tunable phase shifter.

In embodiments of the disclosure, two side edges of the sectional shape of at least one of the first electrode 40 and the second electrode 50 along the corresponding thickness direction have a same angle to a bottom edge (slope angle) of the sectional shape. In an exemplary embodiment, the angles of the two side edges to the bottom edge of the sectional shape of the first electrode 40 along the thickness direction are the same, and the angles of the two side edges to the bottom edge of the sectional shape of the second electrode 50 along the thickness direction are the same. Still referring to FIG. 4, taking the first electrode 40 as an example, the angles of the two side edges to the bottom edge are respectively $\phi_1$ and $\phi_2$, where $\phi_1=\phi_2$. Accordingly, the sectional shape of the first electrode 40 can be an isosceles trapezoid. Based on the same design principle, the sectional shape of the second electrode 50 can also be an isosceles trapezoid symmetrically designed with the first electrode 40. In this way, the symmetry of the overlapping area of the variable capacitor 60 is ensured. In an exemplary embodiment, it can be that merely the first electrode 40 along the thickness direction has the same angle of the two side edges to the bottom edge of the sectional shape. In an exemplary embodiment, it can be that merely the second electrode 50 along the thickness direction has the same angle of the two side edges to the bottom edge of the sectional shape. Of course, the specific values of the same angle of the two side edges to the bottom edge of the sectional shape along the corresponding thickness direction of the at least one of the first electrode 40 and the second electrode 50 can be set according to actual application needs, which is not limited here.

Still referring to FIG. 4, the range of the angle is (0°, 90°). For example, $\phi_1=\phi_2=45°$. In the actual implementation process, the specific angle of the two side edges to the bottom edge of the trapezoid corresponding to each sectional shape can be designed according to the required phase-shifting degree of the tunable phase shifter, which is not limited here.

Figure 5:
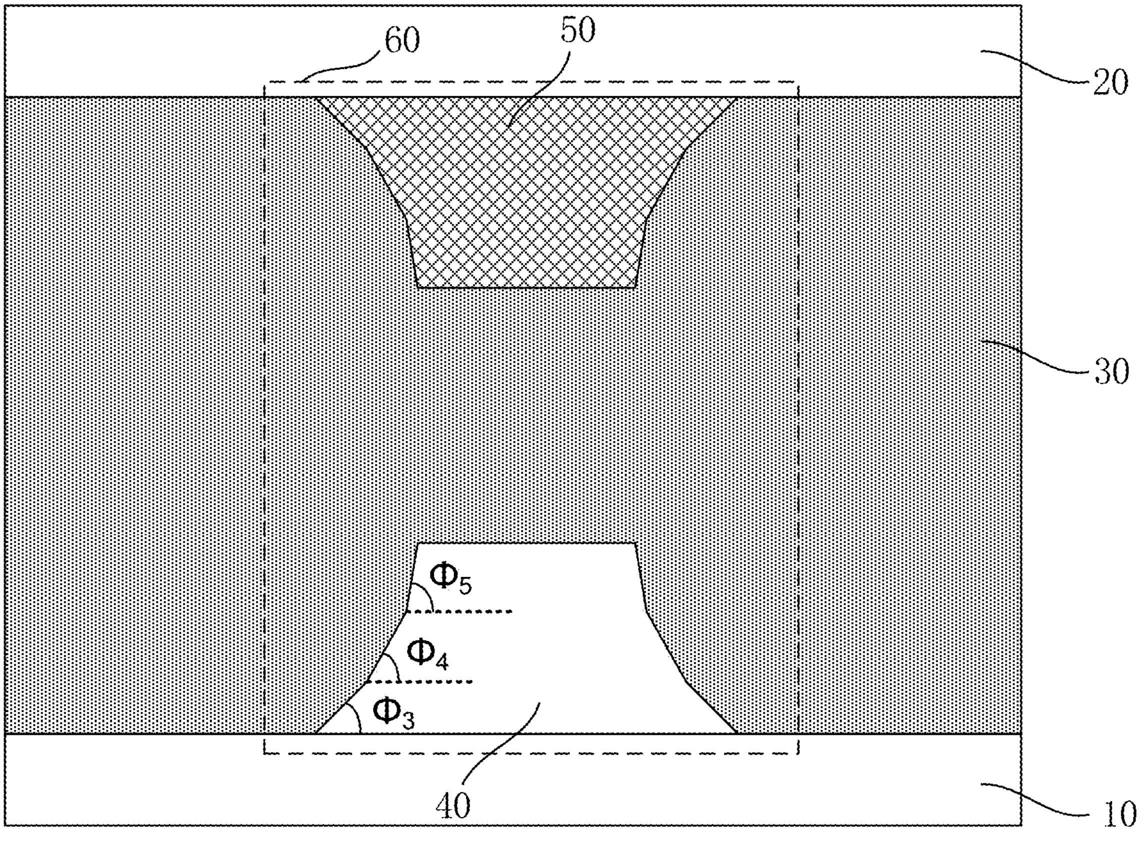
FIG. 5 is sectional view taken along the direction AA shown in FIG. 2.

In an exemplary embodiment of the disclosure, as shown in FIG. 5 which is a sectional view taken along the direction AA of FIG. 2, the sectional shapes of the first electrode 40 and the second electrode 50 along the respective thickness directions have side edges that are arc-shaped and concave towards a central position of the corresponding sectional shape.

Still referring to FIG. 5, the side edges of the sectional shapes of the first electrode 40 and the second electrode 50 along the respective thickness directions are arc-shaped, and the arc-shaped side edges are concave towards the central position of the corresponding sectional shape. Accordingly, for the first electrode 40, in the direction facing away from the first substrate 10, the angle between the side edge at a position and a direction parallel to the bottom edge increases. In this way, in a case that the thicknesses of the metal film layers corresponding to the first electrode 40 and the second electrode 50 are relatively thick, due to the longer etching time, a duration of the metal film layer in contact with the etchant at different positions of the metal film layer will also differ. This provides the possibility of depositing a metal film layer of the required thickness over the entire surface during the electroplating process. As shown in FIG. 5, the angles at three different positions of the side edge to the direction parallel to the bottom edge, are respectively $\phi_3$, $\phi_4$, and $\phi_5$, and $\phi_3<\phi_4<\phi_5$. Furthermore, the design principle of the second electrode 50 is the same as that of the first electrode 40, without elaboration.

It should be noted that under the same process parameters, the angle between the side edge and the bottom edge of the sectional shape of the first electrode 40 at a same thickness has a same value; and the angle between the side edge and the bottom edge of the sectional shape of the second electrode 50 at a same thickness has a same value.

Figure 6:
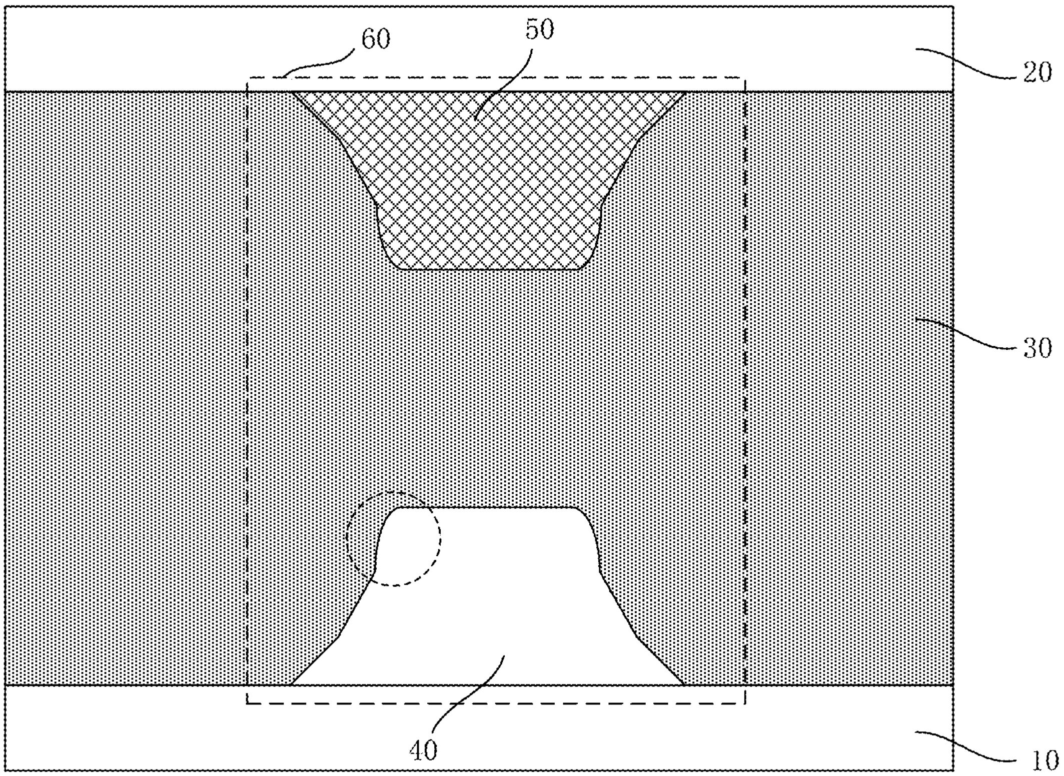
FIG. 6 is sectional view taken along the direction AA shown in FIG. 2.
Figure 7:
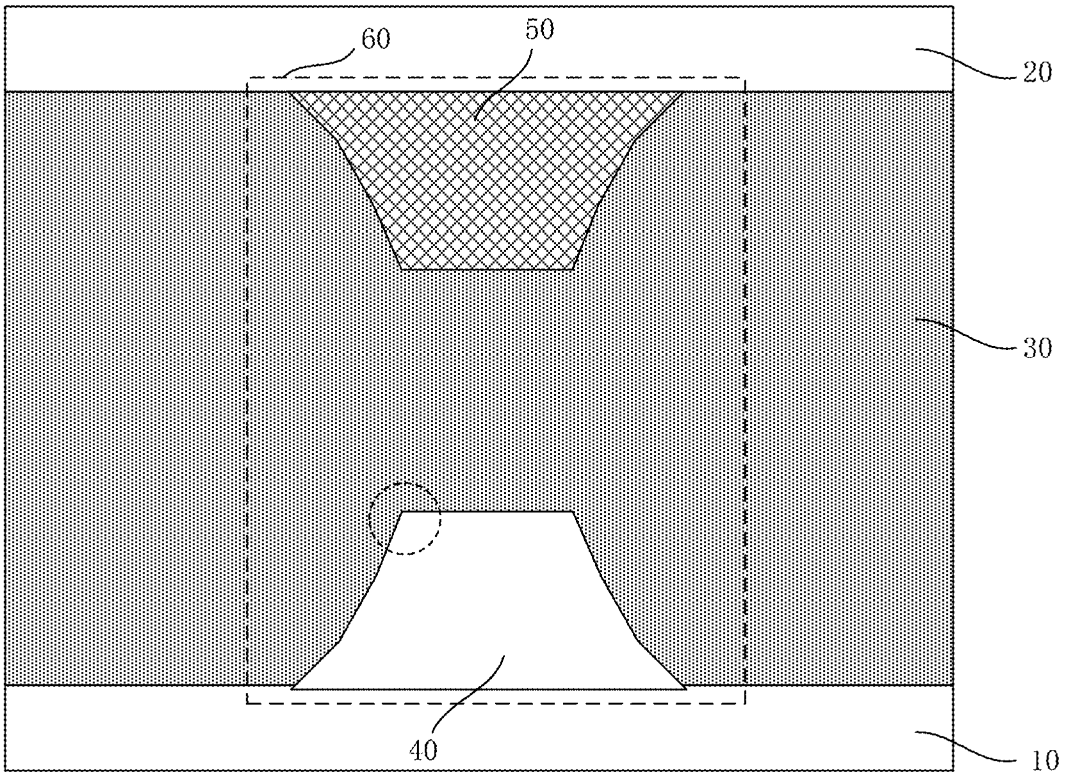
FIG. 7 is sectional view taken along the direction AA shown in FIG. 2.

In an exemplary embodiment of the disclosure, as shown in FIG. 6 which is a sectional view taken along the direction AA in FIG. 2, the sectional shape of the first electrode 40 and the sectional shape of the second electrode 50 along the respective thickness directions each has chamfers between the corresponding side edges and top edge. Still referring to FIG. 6, each of the sectional shapes of the first electrode 40 and the second electrode 50 along the respective thickness directions has round corners between the side edges and top edge. Referring to FIG. 7, each of the sectional shapes of the first electrode 40 and the second electrode 50 along the respective thickness directions has sharp angles between the corresponding side edges and top edge. In other words, the right angle in the first electrode 40 and the second electrode 50 of the variable capacitor 60 can be adjusted to a round corner or a chamfer, thereby avoiding the risk of sharp discharge under high-power signals.

In embodiments of the disclosure, referring to FIG. 4, the capacitance value of the variable capacitor 60 is given by:

$$C_1 = \frac{\varepsilon_0\varepsilon_r \times L \times (L_1 + L_2')/2}{(D_1 + D_2)/2}.$$

Here, $C_1$ indicates a capacitance value of the variable capacitor 60, $\varepsilon_0$ indicates the vacuum dielectric constant, $\varepsilon_r$ indicates the relative dielectric constant, L indicates an extension length of the first electrode 40 and the second electrode 50, $L_1$ indicates a length of the top edge of the sectional shape of the first electrode 40 and the second electrode 50 along the corresponding thickness direction, $L_2'$ indicates a length of the bottom edge of the sectional shape of the first electrode 40 and the second electrode 50 along the corresponding thickness direction, $D_1$ indicates a distance between the top edge of the sectional shape of the first electrode 40 and the top edge of the sectional shape of the second electrode 50 along the corresponding thickness direction in the overlapping area, and $D_2$ indicates a distance between the bottom edge of the sectional shape of the first electrode 40 and the bottom edge of the sectional shape of the second electrode 50 along the corresponding thickness direction in the overlapping area.

In specific implementations, the sectional shape of the first electrode 40 and the second electrode 50 can be equivalently considered as an isosceles trapezoid, where the angle between the side edge and the bottom edge is the same as $\phi$ (i.e., $\phi_1=\phi_2=\phi$), as shown in FIG. 4. Correspondingly, the capacitance value of the variable capacitor 60 can be equivalently expressed as:

$$C_1 = \frac{\varepsilon_0\varepsilon_r \times L \times (L_1 + L_2')/2}{(D_1 + D_2)/2}.$$

Correspondingly, $$\tan\phi = \frac{(D_2 - D_1)/2}{(L_2' - L_1)/2}.$$

Figure 8:
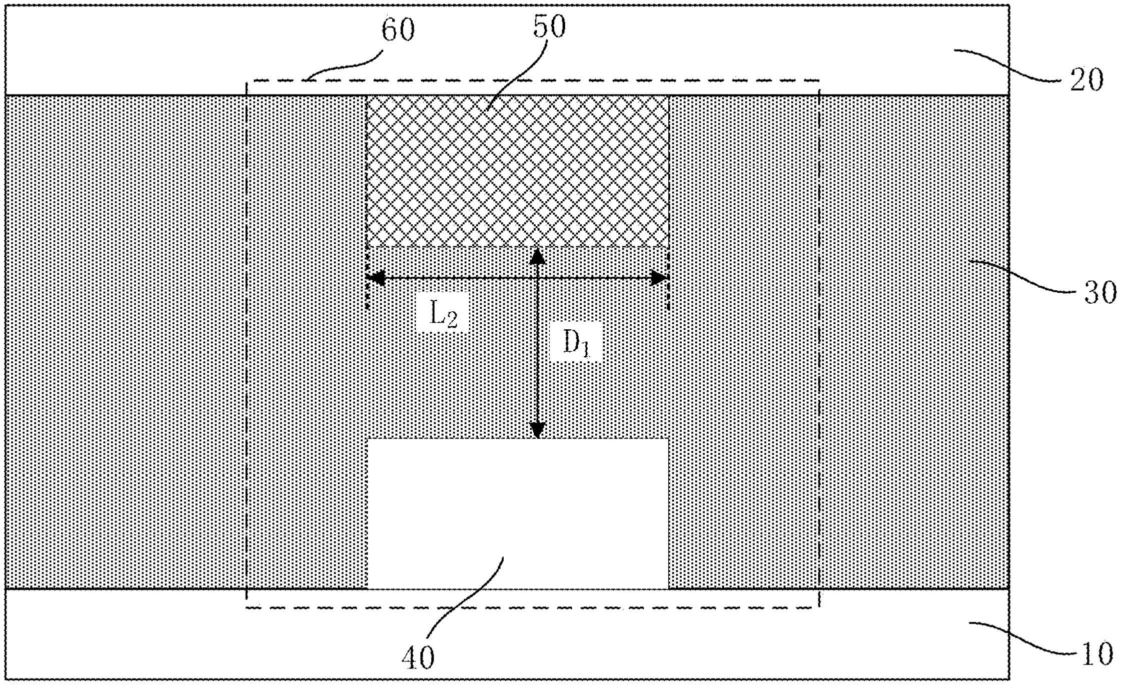
FIG. 8 is schematic structural diagram of a phase shifter obtained by the process flow as shown in FIG. 1.

In the embodiments of the disclosure, it was found that a phase shifter structure as shown in FIG. 8 can be obtained by using the process flow shown in FIG. 1. In order to ensure that the capacitance value of the variable capacitor 60 provided in the embodiments of the disclosure is equal to the capacitance value of the phase shifter shown in FIG. 8 while considering the thickness uniformity of the metal film layer, when the capacitor lengths are equal, it is necessary to increase the capacitor width corresponding to the variable capacitor 60, that is, the width of the corresponding first electrode 40 and second electrode 50.

In an ideal case, the capacitance value of the overlapping capacitor of the phase shifter shown in FIG. 8 is given by:

$$C_1 = \frac{\varepsilon_0\varepsilon_r \times L \times L_2}{D_1}.$$

Here, $\varepsilon_0$ indicates the vacuum dielectric constant, $\varepsilon_r$ indicates the relative dielectric constant, L indicates an extension length of the electrodes of the overlapping capacitor, $L_2$ indicates a width of the overlapping capacitor, and $D_1$ indicates a distance between the two electrodes of the overlapping capacitor.

Thus, when the capacitance values of the two capacitors are equal, the capacitor width of the tunable phase shifter in the embodiments of the disclosure can be:

$$L_2' = L_2 + \frac{L_2 \times (D_2 - D_1)}{2D_1} + \frac{1}{2} \times (D_2 - D_1) \times \cot\phi.$$

In the actual preparation process of the tunable phase shifter in the embodiments of the disclosure, the capacitor width of the variable capacitor 60 of the tunable phase shifter can be determined by compensating the capacitor width of the overlapping capacitor according to the required capacitance value of the overlapping capacitor needed for the traditional electroplating process, thereby ensuring the phase-shifting performance of the tunable phase shifter while considering the thickness uniformity of the metal film layer corresponding to the electrodes of the overlapping capacitor.

Figure 9:
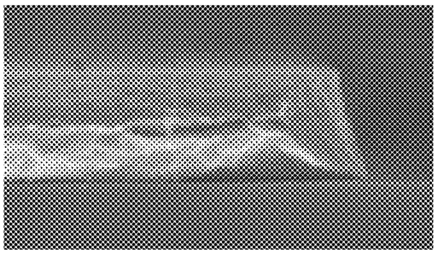
FIG. 9 is a partial scanning electron microscope (SEM) morphological schematic diagram of an electrode corresponding to a variable capacitor in the actual process of the tunable phase shifter provided in embodiments of the disclosure.

In addition, it should be noted that in the actual preparation process of the tunable phase shifter in the embodiments of the disclosure, the angle between the side edge and the bottom edge of the corresponding first electrode 40 and the second electrode 50 will be affected and changed by various factors such as etchant composition, copper thickness, and equipment. Moreover, the sectional shape of the first electrode 40 and the second electrode 50 along the corresponding thickness direction is not a standard trapezoid. In the actual process, for the first electrode 40 and the second electrode 50, when the material is copper, the electroplating seed layer is molybdenum (Mo)/Cu with a thickness of 300 Å/5000 Å, and the thickness of the entire metal film layer (including the seed layer) after electroplating the thick copper is 2 μm. The partial scanning electron microscope (SEM) morphology of a part of the corresponding electrode is shown in FIG. 9. Of course, under different process parameters, the SEM morphology corresponding to the first electrode 40 and the second electrode 50 may vary, which is not described in detail here.

Considering that the sectional shape of the first electrode 40 and the second electrode 50 along the corresponding thickness direction is not a standard trapezoid, in order to more accurately determine the capacitor width of the tunable phase shifter in the embodiments of the disclosure, it is possible to perform segmented integration and calculate the equivalent capacitance value based on the actual film shape and the slope angle at different positions of the corresponding side edge along the thickness direction. Then, according to the equivalent relationship between the equivalent capacitance value and the ideal equivalent capacitance value, the required compensation width can be determined, thereby determining the capacitor width of the tunable phase shifter in the embodiments of the disclosure and improving the accuracy of the capacitance compensation of the tunable phase shifter.

It should be noted that the relevant solutions for the metal film layer corresponding to the electrodes of the variable capacitor 60 in the embodiments of the disclosure are applicable to the design of various tunable phase shifters, realizing better control of the process fluctuations in capacitor distance and ensuring the overall performance of the corresponding tunable phase shifter. In specific implementations, the tunable phase shifter provided in the embodiments of the disclosure can be a phase shifter of dual-line structure or a phase shifter of single-line structure.

Figure 10:
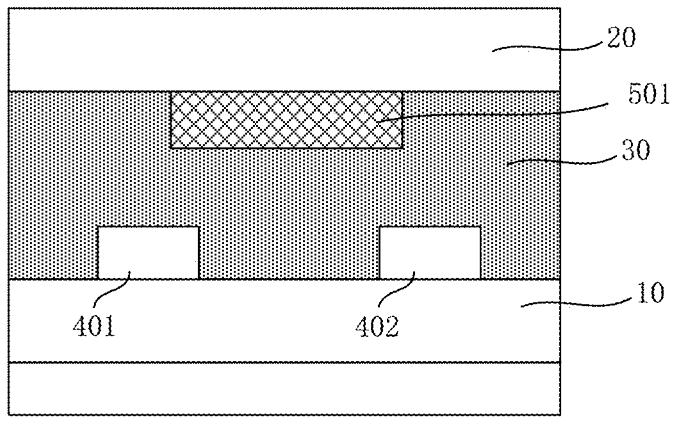
FIG. 10 is a sectional view taken along the direction BB shown FIG. 2.

For a phase shifter of dual-line structure, as shown in FIG. 10 which is a sectional view taken along the direction BB in FIG. 2, the first electrode 40 includes a first signal electrode 401 and a second signal electrode 402 spaced from each other and the second electrode 50 includes a first patch electrode 501 attached to a side of the second substrate 20 facing the variable dielectric layer 30. An orthographic projection of the first signal electrode 401 on the first substrate 10 and an orthographic projection of the second signal electrode 402 on the first substrate 10 both overlap at least partially with an orthographic projection of the first patch electrode 501 on the first substrate 10, forming the variable capacitor 60. In an exemplary embodiment, the first patch electrode 501 can be attached to the surface of the second substrate 20 facing the variable dielectric layer 30. Still referring to FIG. 10, the overlapping area of the first signal electrode 401 with the first patch electrode 501 and the overlapping area of the second signal electrode 402 with the first patch electrode 501 both contribute to the variable capacitor 60. In addition, still referring to FIG. 10, a grounding electrode is further provided on the surface of the first substrate 10 facing away from the variable dielectric layer 30, providing a reference for the first signal electrode 401 and the second signal electrode 402, so as to form a structure similar to a microstrip transmission line.

Figure 11:
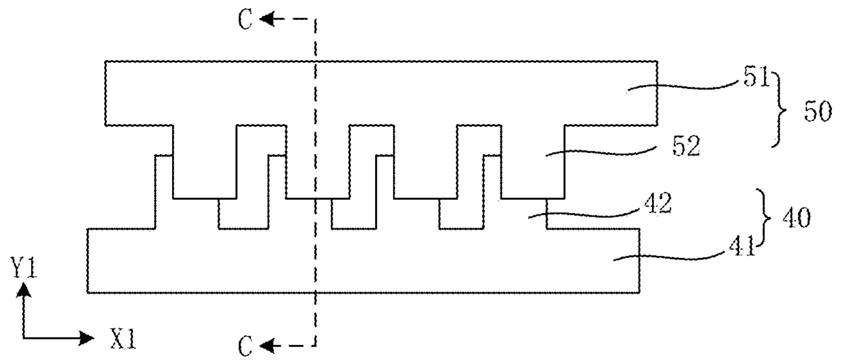
FIG. 11 is a top view of a tunable phase shifter provided in embodiments of the disclosure.
Figure 12:
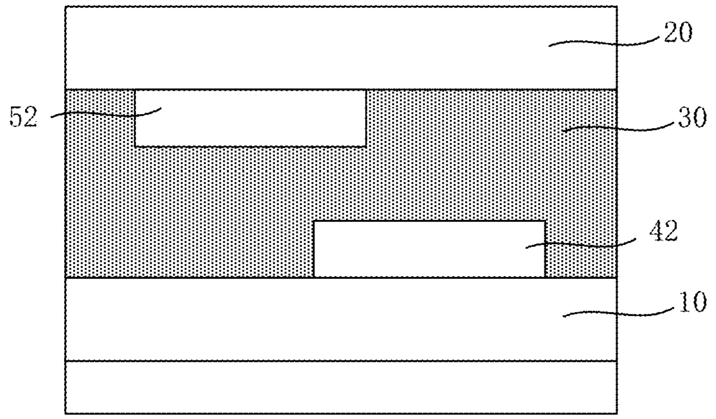
FIG. 12 is a sectional view taken along the direction CC shown FIG. 11.

For a phase shifter of dual-line structure, in an exemplary embodiment, as shown in FIGS. 11 and 12, FIG. 11 is a top view of the tunable phase shifter, and FIG. 12 is a sectional view taken along the direction CC in FIG. 11. Specifically, the first electrode 40 includes a first body part 41 extending along a first direction and multiple first branch parts 42 connected with the first body part 41 and extending along a second direction intersecting with the first direction. The second electrode 50 includes a second body part 51 extending along the first direction and multiple second branch parts 52 connected with the second body part 51 and extending along the second direction. The first branch parts 42 and the corresponding second branch parts 52 at least partially overlap, forming the variable capacitor 60.

Still referring to FIGS. 11 and 12, the first electrode 40 includes the first body part 41 extending along the first direction and multiple first branch parts 42 extending along the second direction intersecting with the first direction. The first direction is shown as arrow X1 in FIG. 11, and the second direction is shown as arrow Y1 in FIG. 11. The quantity of the multiple first branch parts 42 can be set according to the actual requirements for the phase shifting degree of the tunable phase shifter, which is not limited here. In addition, the second electrode 50 includes the second body part 51 extending along the first direction and multiple second branch parts 52 connected with the second body part 51 and extending along the second direction. The quantity of the multiple second branch parts 52 can be set according to the actual requirements for the phase shifting degree of the tunable phase shifter. The orthographic projection of the first branch part 42 on the first substrate 10 and the orthographic projection of the second branch part 52 corresponding to the first branch part 42 on the first substrate 10 at least partially overlap. As such, the overlapping area of the first branch part 42 with the second branch part 52 can form a variable capacitor 60, thereby ensuring the phase-shifting performance of the tunable phase shifter. In practical applications, the quantity of the first branch parts 42 and the quantity of the second branch parts 52, as well as the overlapping area of the first branch parts 42 and the second branch parts 52, can be set according to the actual requirements for the phase shifting degree of the tunable phase shifter.

Figure 13:
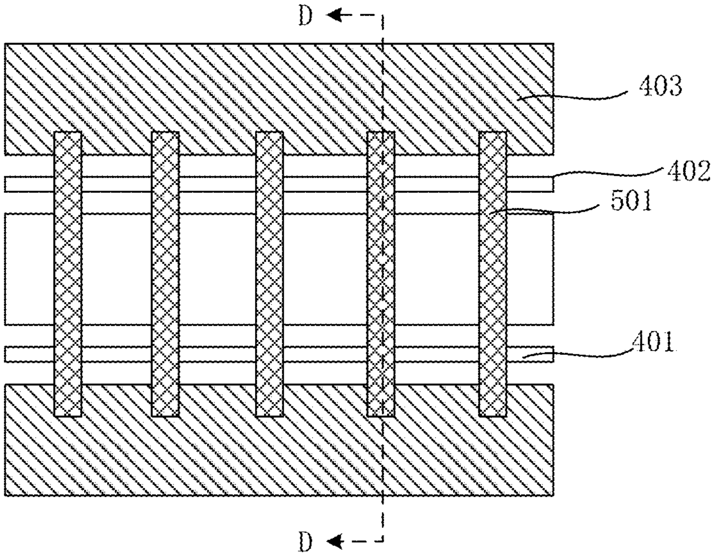
FIG. 13 is a top view of a tunable phase shifter provided in embodiments of the disclosure.
Figure 14:
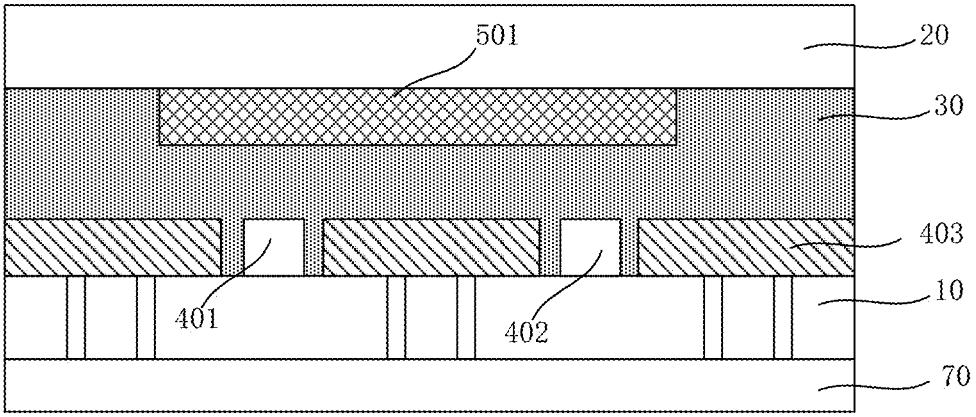
FIG. 14 is a sectional view taken along the direction DD shown FIG. 13.

For a phase shifter of dual-line structure, in an exemplary embodiment, as shown in FIGS. 13 and 14, FIG. 13 is a top view of the tunable phase shifter, and FIG. 14 is a sectional view taken along the direction DD in FIG. 13. Specifically, the first electrode 40 includes multiple first grounding electrodes 403 arranged at intervals, each of the multiple first grounding electrodes 403 is coupled to a second grounding electrode 70 on the side of the first substrate 10 facing away from the variable dielectric layer 30 through a through hole penetrating through the first substrate 10 in the thickness direction of the first substrate 10. An orthographic projection of each of the first grounding electrodes 403 on the first substrate 10 completely falls into a range of an orthographic projection of the second grounding electrode 70 on the first substrate 10. The orthographic projection of each of the first grounding electrodes 403 on the first substrate 10 at least partially overlaps with the orthographic projection of the first patch electrode 501 on the first substrate 10, forming the variable capacitor 60.

Still referring to FIGS. 13 and 14, the first electrode 40 includes multiple first grounding electrodes 403 arranged at intervals, each of the multiple first grounding electrodes 403 is coupled to the second grounding electrode 70 on the side of the first substrate 10 facing away from the variable dielectric layer 30 through a through hole penetrating through the first substrate 10 in the thickness direction of the first substrate 10. This provides a reference for the first signal electrode 401 and the second signal electrode 402 to form a structure similar to a microstrip transmission line. In addition, the orthographic projection of each of the first grounding electrodes 403 on the first substrate 10 completely falls into the range of the orthographic projection of the second grounding electrode 70 on the first substrate 10. This enhances the usability of the tunable phase shifter. Moreover, in addition to the overlapping area of the first signal electrode 401 with the first patch electrode 501 and the overlapping area of the second signal electrode 402 with the first patch electrode 501 that contribute to the variable capacitor 60, the overlapping area between each first grounding electrode 403 and the first patch electrode 501 can also contribute to the variable capacitor 60 since the orthographic projection of each of the first grounding electrodes 403 on the first substrate 10 at least partially overlaps with the orthographic projection of the first patch electrode 501 on the first substrate 10, ensuring the phase-shifting performance of the tunable phase shifter.

Figure 15:
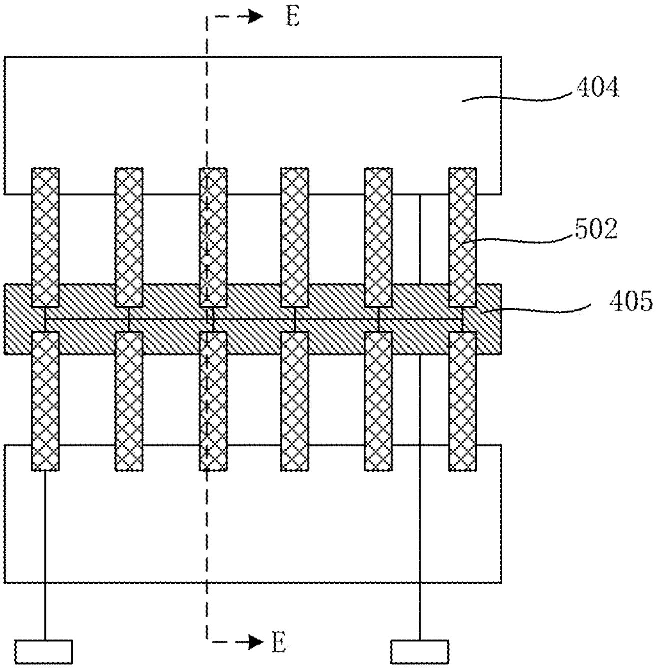
FIG. 15 is a top view of a tunable phase shifter provided in embodiments of the disclosure.
Figure 16:
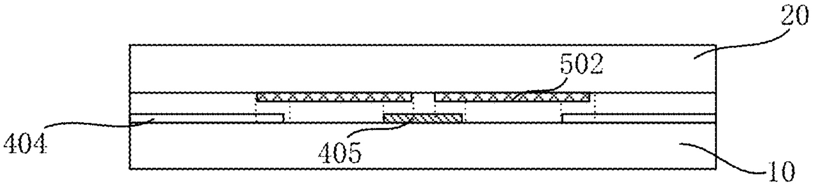
FIG. 16 is a sectional view taken along the direction EE shown FIG. 15.

For a phase shifter of single-line structure, it can be a coplanar waveguide (CPW) phase shifter. In an exemplary embodiment, as shown in FIGS. 15 and 16, FIG. 15 is a top view of the phase shifter, and FIG. 16 is a sectional view taken along the direction EE in FIG. 15. Specifically, the first electrode 40 includes multiple third grounding electrodes 404 arranged at intervals and a third signal electrode 405 between adjacent third grounding electrodes 404. The second electrode 50 includes multiple second patch electrodes 502 arranged at intervals. Orthographic projections of each of the third grounding electrodes 404 and the third signal electrode 405 on the first substrate 10, at least partially overlap with an orthographic projection of the corresponding second patch electrode 502 on the first substrate 10, contributing to the variable capacitor 60.

Still referring to FIGS. 15 and 16, the first electrode 40 includes the multiple third grounding electrodes 404 arranged at intervals and the third signal electrode 405 between adjacent third grounding electrodes 404. In an exemplary embodiment, the multiple third grounding electrodes 404 and third signal electrodes 405 can all be disposed on the surface of the first substrate 10 facing the variable dielectric layer 30. The second electrode 50 includes multiple second patch electrodes 502 arranged at intervals. Moreover, the orthographic projections of each third grounding electrode 404 and the third signal electrode 405 on the first substrate 10, at least partially overlap with the orthographic projection of the corresponding second patch electrode 502 on the first substrate 10. As such, the overlapping area between each third grounding electrode 404 and the second patch electrode 502 can form the variable capacitor 60, and the overlapping area between the third signal electrode 405 and the second patch electrode 502 can form the variable capacitor 60. In practical applications, the quantity of third grounding electrodes 404 and the second patch electrodes 502 can be set according to the actual requirements for the phase shifting degree of the tunable phase shifter, which is not limited here.

Figure 17:
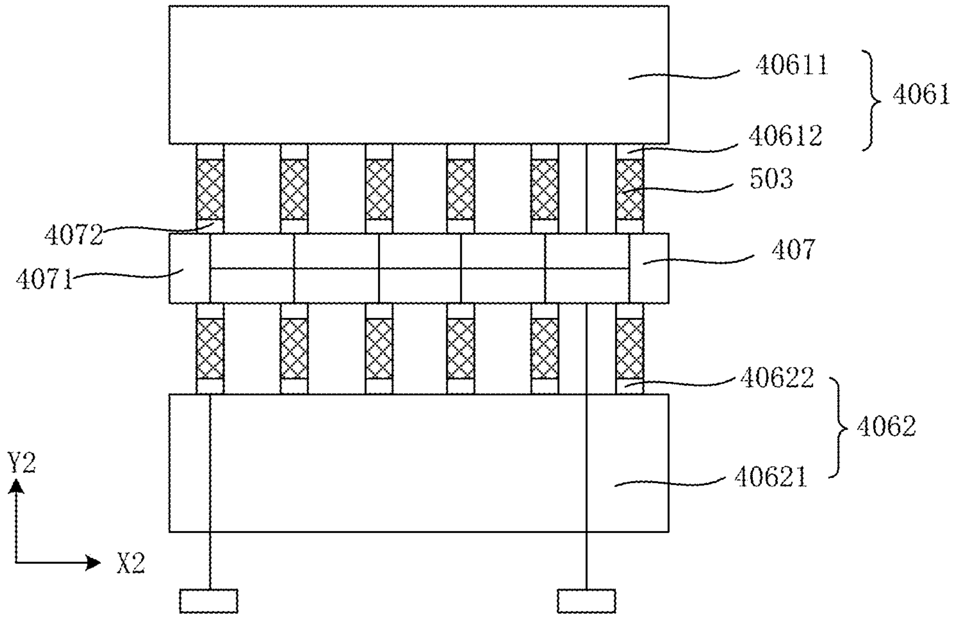
FIG. 17 is a top view of a tunable phase shifter provided in embodiments of the disclosure.
Figure 18:
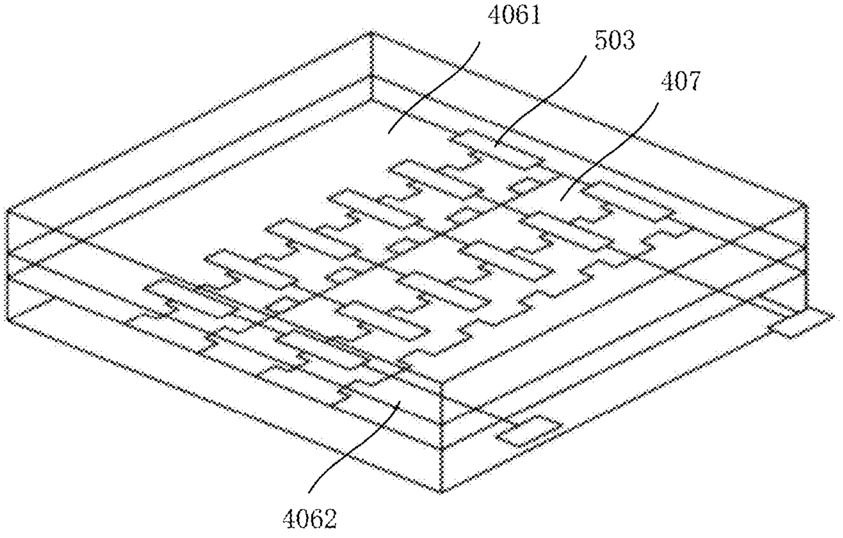
FIG. 18 is a perspective view corresponding to FIG. 17.

For a phase shifter of single-line structure, in an exemplary embodiment, as shown in FIGS. 17 and 18, FIG. 17 is a top view of the tunable phase shifter, and FIG. 18 is a perspective view corresponding to FIG. 17. Specifically, the first electrode 40 includes a fourth grounding electrode 406 and a fourth signal electrode 407. The fourth grounding electrode 406 includes spaced first sub-grounding electrode 4061 and second sub-grounding electrode 4062. The fourth signal electrode 407 is located between the first sub-grounding electrode 4061 and the second sub-grounding electrode 4062. The second electrode 50 includes multiple third patch electrodes 503 arranged at intervals.

The fourth signal electrode 407 includes a third body part 4071 extending along a third direction and multiple third branch parts 4072 connected with the third body part 4071 and extending along a fourth direction intersecting with the third direction.

The first sub-grounding electrode 4061 includes a fourth body part 40611 extending along the third direction, and multiple fourth branch parts 40612 connected with the fourth body part 40611 and extending along the fourth direction.

The second sub-grounding electrode 4062 includes a fifth body part 40621 extending along the third direction, and multiple fifth branch parts 40622 connected with the fifth body part 40621 and extending along the fourth direction.

An orthographic projection of each of the third patch electrodes 503 on the first substrate 10, at least partially overlaps with an orthographic projection of each of the corresponding third branch parts 4072, fourth branch parts 40612, and fifth branch parts 40622 on the first substrate 10, forming the variable capacitor 60.

Still referring to FIGS. 17 and 18, the third direction is shown as arrow X2 in FIG. 17, and the fourth direction is shown as arrow Y2 in FIG. 17. The fourth signal electrode 407 has multiple tunable third branch parts 4072. The first sub-grounding electrode 4061 in the fourth grounding electrode 406 has multiple tunable fourth branch parts 40612. The second sub-grounding electrode 4062 in the fourth grounding electrode 406 has multiple tunable fifth branch parts 40622. In this way, not only can the variable capacitor 60 be formed by the partial overlapping of each third patch electrode 503 with the corresponding fourth branch part 40612 and third branch part 4072, but also the variable capacitor 60 can be formed by the partial overlapping of each third patch electrode 503 with the corresponding fifth branch part 40622 and third branch part 4072, ensuring the phase-shifting performance of the tunable phase shifter.

Figure 19:
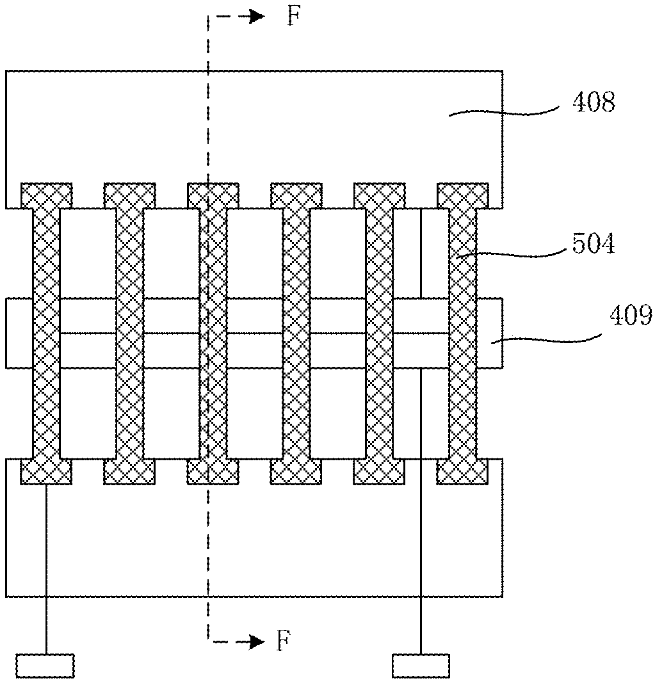
FIG. 19 is a top view of a tunable phase shifter provided in embodiments of the disclosure.
Figure 20:
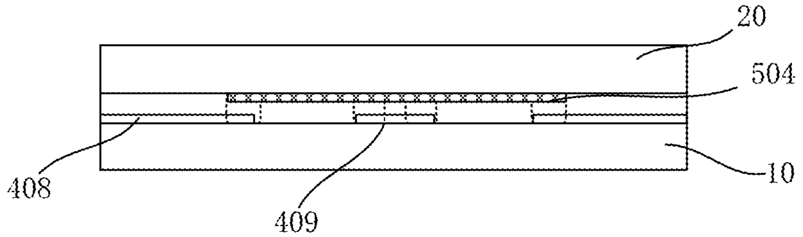
FIG. 20 is a sectional view taken along the direction FF shown FIG. 19.

For a phase shifter of single-line structure, in an exemplary embodiment, as shown in FIGS. 19 and 20, FIG. 19 is a top view of the tunable phase shifter, and FIG. 20 is a sectional view taken along the direction FF in FIG. 19. Specifically, the first electrode 40 includes multiple spaced fifth grounding electrodes 408 and a fifth signal electrode 409 between adjacent fifth grounding electrodes 408. The second electrode 50 includes a fourth patch electrode 504 attached to a side of the second substrate 20 facing the variable dielectric layer 30. Orthographic projections of each of the fifth grounding electrodes 408 and the fifth signal electrode 409 on the first substrate 10, at least partially overlap with the orthographic projection of the fourth patch electrode 504 on the first substrate 10, forming the variable capacitor 60.

Still referring to FIGS. 19 and 20, the orthographic projection of the fifth signal electrode 409 located on the side of the first substrate 10 facing the variable dielectric layer 30 on the first substrate 10 completely falls within the range of the orthographic projection of the fourth patch electrode 504 attached to the surface of the second substrate 20 facing the variable dielectric layer 30 on the first substrate 10. In this way, the fourth patch electrode 504 and the fifth signal electrode 409 in the overlapping area can contribute to the variable capacitor 60. Additionally, the orthographic projection of each fifth grounding electrode 408 on the first substrate 10 partially overlaps with the orthographic projection of the fourth patch electrode 504 on the first substrate 10, allowing the overlapping area between the fifth grounding electrode 408 and the fourth patch electrode 504 to contribute to the variable capacitor 60. This ensures the phase-shifting performance of the tunable phase shifter.

Figure 21:
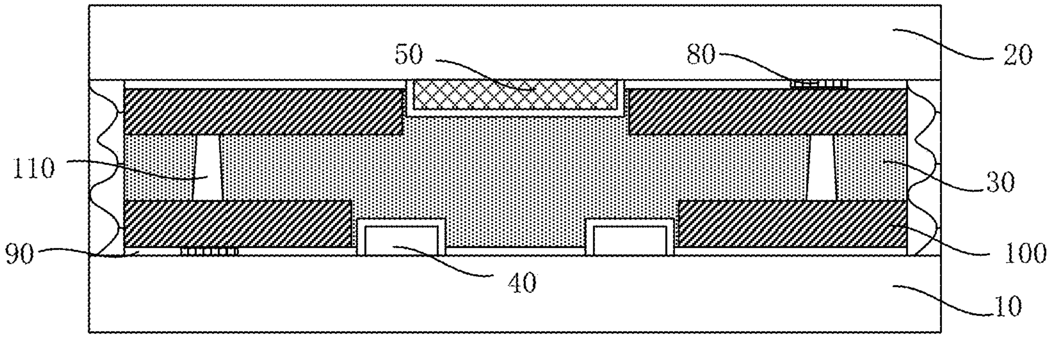
FIG. 21 is a sectional view taken along the direction BB shown FIG. 2.

In the embodiments of the disclosure, as shown in FIG. 21 which is a sectional view taken along the direction BB in FIG. 2, in addition to the relevant film layers mentioned above, taking the first substrate 10 as an example, the tunable phase shifter further includes a pattern of marking metal layer 80 on a side of the first substrate 10 facing the variable dielectric layer 30, a first passivation layer (not shown in the figure) on a side of the marking metal layer 80 facing away from the first substrate 10, a second passivation layer 90 on a side of the first electrode 40 facing away from the first substrate 10, a filling layer 100 on a side of the second passivation layer 90 facing away from the first substrate 10, multiple support spacers 110 between the first substrate 10 and the second substrate 20, and an alignment layer (not shown in the figure) on a side of the variable dielectric layer 30 close to the first substrate 10. The material of the marking metal layer 80 can be Mo or Al, which is not limited here.

The materials of the first and second passivation layers 90 can be silicon nitride (SiN) or silicon oxide (SiO), which are not limited here. In an exemplary embodiment, a dielectric constant of the first passivation layer is controlled to range from 2 to 4, so as to reduce the impact on the phase-shifting degree and insertion loss of the tunable phase shifter. The second passivation layer 90 can slow down the internal stress caused by the metal transmission line with excessive thickness, protect the corresponding metal film layer of the electrode, and prevent chemical reactions of the corresponding metal film layer with the liquid crystal or air upon contact. The filling layer 100 can be a resin material, and in the actual process, it can smooth relevant film layers and metal transmission line layers by a spin coating process. The filling layer can also be controlled to have a height of about 0.5 μm above the metal transmission line layer using a slit coating process, and support spacers can be prepared on it after the curing process. For example, the height of these support spacers can be in the range of 2 μm to 5 μm. For low-frequency tunable phase shifters, the height of the support spacers 110 can range from 30 μm to 40 μm. Of course, the height of the support spacers 110 can be set according to the actual application needs, which is not limited here.

Furthermore, the alignment layer can be a polyimide (PI) film. In the case where the variable dielectric layer 30 in the phase shifter is a liquid crystal layer, the liquid crystal molecules in the liquid crystal layer can be inclined at a predetermined angle by pre-setting the alignment layer. The film layer structures on the first substrate 10 and the second substrate 20 are symmetrically arranged, and the film layer structure on the second substrate 20 can refer to the description of the corresponding part on the first substrate 10, which is not repeated here. In this way, after applying a driving voltage to the relevant electrodes, the adjustment efficiency of dielectric constant of the liquid crystal layer is improved, thereby enhancing the phase-shifting efficiency of the tunable phase shifter. Of course, other film layers of the tunable phase shifter can be set according to actual application needs, and specific settings can be referred to in the relevant technology, which are not described in detail here.

Figure 22:
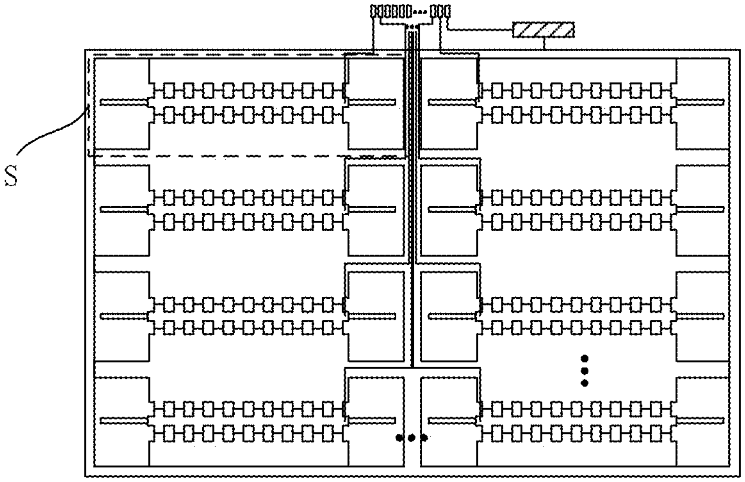
FIG. 22 is a top view of an array of phase shifters provided in embodiments of the disclosure.

It should be noted that the tunable phase shifter provided in the embodiments of the disclosure, in addition to the structure mentioned above, can also be set with a specific structure according to actual application needs, which is not described in detail here. In addition, based on the tunable phase shifter provided in the embodiments of the disclosure, multiple tunable phase shifters can form a phase shifter array as shown in FIG. 22, in which the box S indicates one phase shifter. In specific implementations, each tunable phase shifter in the phase shifter array can be a co-planar phase shifter based on CPW, or it can be a non-co-planar phase shifter based on CPW. For the co-planar phase shifters, the signal electrode and the grounding electrode are located on the same surface of the same substrate, that is, on the same side inside the variable dielectric layer 30, and an orthographic projection area is formed with an overlapping electrode patch to form the variable capacitor 60. For the non-co-planar phase shifters, the signal electrode and the grounding electrode are located on opposite sides inside the variable dielectric layer 30, and the overlapping electrode patch is formed by branches from the signal electrode and/or the grounding electrode, so that the orthographic projection area is formed, thereby forming the variable capacitor 60.

Figure 23:
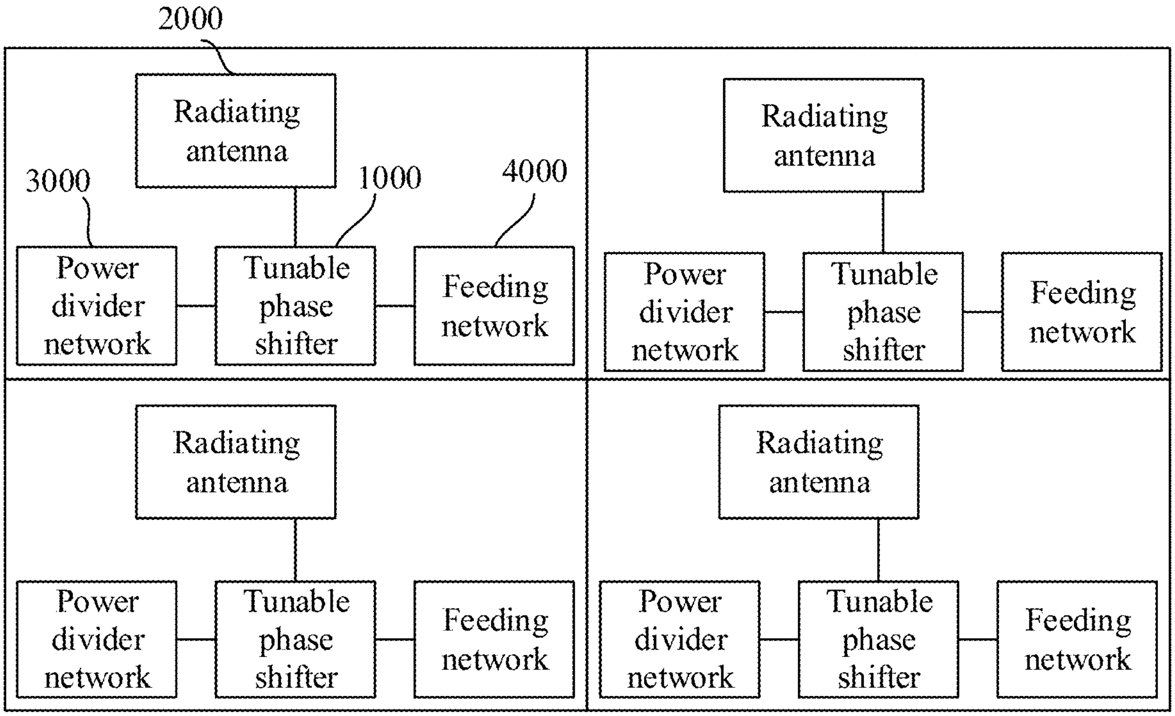
FIG. 23 is a structural schematic diagram of an electronic device provided in embodiments of the disclosure.

Based on the same invention conception, as shown in FIG. 23, embodiments of the disclosure provide an electronic device, including: tunable phase shifters 1000 mentioned above, radiating antennas 2000, power divider networks 3000, and feeding networks 4000 arranged in an array.

In specific implementations, the power divider network 3000 and the feeding network 4000 can be the same network structure. Moreover, for the specific structure of the radiating antenna 2000, the power divider network 3000, and the feeding network 4000, specific implementations in the relevant technology can be referred to, which are not described in detail here. Additionally, the principle of solving the problem of the electronic device is similar to the aforementioned tunable phase shifter, so the implementation of the electronic device can refer to the implementation of the tunable phase shifter mentioned above, and repeated parts are not repeated here.

Figure 24:
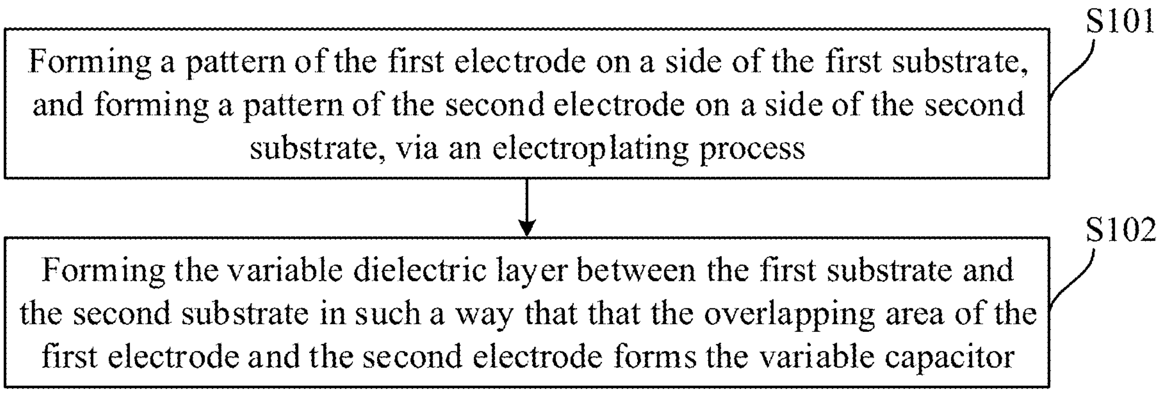
FIG. 24 is a flowchart of a method of manufacturing the tunable phase shifter provided in embodiments of the disclosure.

Based on the same invention conception, as shown in FIG. 24, embodiments of the disclosure provide a method for manufacturing the tunable phase shifter mentioned above, and the manufacturing method includes the following.

S101: forming a pattern of the first electrode on a side of the first substrate, and forming a pattern of the second electrode on a side of the second substrate, via an electroplating process.

S102: forming the variable dielectric layer between the first substrate and the second substrate in such a way that that the overlapping area of the first electrode and the second electrode forms the variable capacitor.

In specific implementations, the specific implementation process from S101 to S102 is as follows.

First, a pattern of the first electrode on a side of the first substrate and a pattern of the second electrode on a side of the second substrate are formed via an electroplating process, where the specific forming processes of the pattern of the first electrode and the pattern of the second electrode can be seen in the following description. Then, the variable dielectric layer is formed between the first substrate and the second substrate, the first substrate and the second substrate are aligned, where the overlapping area of the first electrode and the second electrode forms the variable capacitor.

Figure 25:
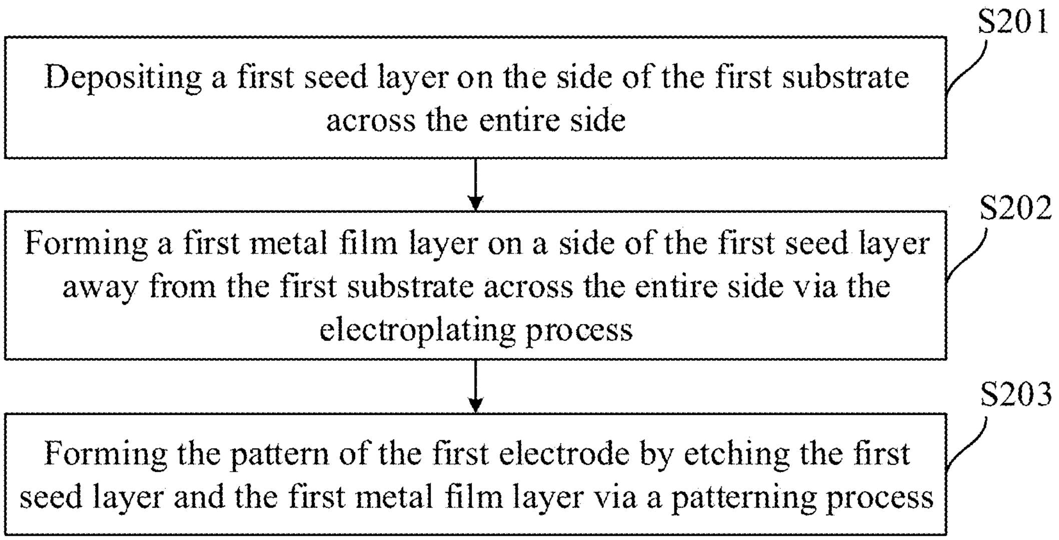
FIG. 25 is a flowchart of S101 in FIG. 24.

In the embodiments of the disclosure, as shown in FIG. 25, the step of forming the pattern of the first electrode on a side of the first substrate, and forming the pattern of the second electrode on a side of the second substrate, via an electroplating process in S101 includes:

S201: depositing a first seed layer on the side of the first substrate across the entire side;

S202: forming a first metal film layer on the side of the first seed layer away from the first substrate across the entire side via the electroplating process;

S203: forming the pattern of the first electrode by etching the first seed layer and the first metal film layer via a patterning process.

Figure 26:
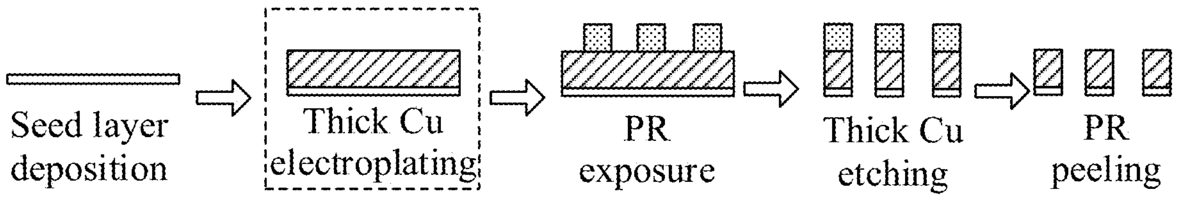
FIG. 26 is a flowchart of an electroplating process in a method of manufacturing the tunable phase shifter provided in embodiments of the disclosure.

In specific implementations, combining with the tunable phase shifter shown in FIG. 21 and the electroplating process flow shown in FIG. 26, the specific implementation process from S201 to S203 is as follows.

The formation of the pattern of the first electrode on one side of the first substrate using the electroplating process is taken as an example.

First, an Al/Mo metal film layer is deposited on the first substrate using physical vapor deposition (PVD); a specific mask (Mask) for marking in subsequent processes is formed via a photomask with a specific pattern (Pattern) combined with an etching process; a SiNx film layer is formed on the above film layer by chemical vapor deposition (CVD), and the dielectric constant of the SiNx film layer is controlled between 2-4 to reduce the impact on the phase-shifting degree and insertion loss of the tunable phase shifter; and a driving line is deposited on the above film layers, which can be a line with a line width of 10 μm and a line spacing of 5 μm formed by ITO film layer. In addition, the driving line can also be an array conductor formed by MoNb/Cu film layers, combined with thin film transistor (TFT) devices to form an active matrix (AM) drive array film layer.

Then, a transmission line film layer is formed on the above film layers via the electroplating process. First, a whole layer of the seed layer is formed using PVD, and then, a whole layer of the first metal film layer is formed on the side of the first seed layer facing away from the first substrate using the electroplating process by the electroplating device, i.e., the metal growth with the required thickness is completed. Then, the pattern of the first electrode is formed by etching the first seed layer and the first metal film layer using the patterning process. Photoresist (PR) can be used to cover and protect the metal pattern to be formed, and the unprotected part can be etched off using etching solution to form the metal film layer with the required pattern. Then, the PR is peeled off to form the first electrode with the required pattern.

Next, a negative stress film layer can be deposited on the above film layers, and the negative stress film layer can be SiNx, which can alleviate the internal stress caused by the metal transmission line layer with excessive thickness, protect the metal film layer, and prevent chemical reactions of the metal film layer with the liquid crystal or air upon contact. Then, a resin material can be sprayed on the film layers away from the first substrate, and the film layers and the metal transmission line layer can be smoothed by a spin coating process. The film layer height can be controlled to be about 0.5 μm above the metal transmission line layer using a slit coating process, and after a curing process, the filling layer is formed. The filling layer ensures the flatness for the subsequent film layer preparation. The support spacers can be formed above the filling layer (not the region of the metal transmission line). The height of the support spacers can be in the range of 2 μm to 5 μm. The support spacers can be formed in the space where the first substrate does not overlap with the metal transmission line or the electrode. The material of the support spacers can be polystyrene (PS) type resin material or oleoresin capsicum (OC) material, and the sectional shape of the support spacer can be square, circular, etc. After preparing the support spacers and the filling layer, a PI film layer can be uniformly laid on the above film layers using an inkjet printing process, and then, the photo-alignment process of the PI film layer can be completed to form the alignment layer using an orientation alignment (OA) device.

Figure 27:
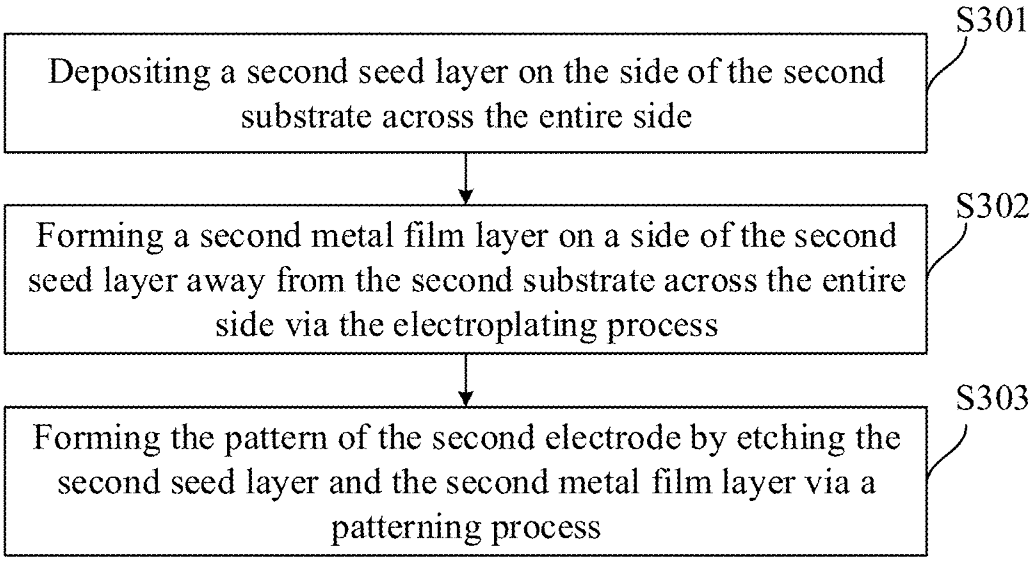
FIG. 27 is a flowchart of S101.

In the embodiments of the disclosure, as shown in FIG. 27, in S101: forming a pattern of the second electrode on the side of the second substrate via the electroplating process, includes:

- S301: depositing a second seed layer on the side of the second substrate across the entire side;
- S302: forming a second metal film layer on the side of the second seed layer away from the second substrate across the entire side via the electroplating process;
- S303: forming the pattern of the second electrode by etching the second seed layer and the second metal film layer via a patterning process.

For the specific implementation process from S301 to S303, a similar process can be used to form the pattern of the second electrode on the second substrate, and other film layers can also be prepared except for the support spacers, and the specific process is not detailed here. Then, the sealant can be coated around the device, the liquid crystal can be dropped in and the alignment can be performed to complete the preparation of the entire device. Alternatively, the sealant can be coated around the device, and the liquid crystal can be filled after alignment, thereby completing the preparation of the entire device.

Although the preferred embodiments of the disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of this disclosure.

Obviously, those skilled in the art can make various changes and modifications to the disclosed embodiments without departing from the spirit and scope of the disclosed embodiments. In this way, if these modifications and variations of the embodiments of the disclosure fall within the scope of the claims of the disclosure and equivalent technologies, the disclosure is also intended to include these modifications and variations.

What is claimed is:

1. A tunable phase shifter, comprising:

a first substrate and a second substrate arranged opposite to each other;

a variable dielectric layer between the first substrate and the second substrate;

a first electrode on a side of the first substrate facing the variable dielectric layer; and a second electrode on a side of the second substrate facing the variable dielectric layer, wherein an overlapping area of the first electrode and the second electrode forms a variable capacitor;

wherein, in a direction facing away from the first substrate, a sectional area of the first electrode along a plane parallel to a plane of the first substrate decreases; and in a direction facing away from the second substrate, a sectional area of the second electrode along a plane parallel to a plane of the second substrate decreases;

wherein a side edge of a sectional shape of each of the first electrode and the second electrode along a corresponding thickness direction is arc-shaped and is concave toward a central position of the sectional shape.

2. The tunable phase shifter according to claim 1, wherein a length of a bottom edge of the sectional shape of the first electrode in contact with the first substrate is greater than length of a top edge of the sectional shape of the first electrode; and a length of a bottom edge of the sectional shape of the second electrode in contact with the second substrate is greater than a length of a top edge of the sectional shape of the second electrode.

3. The tunable phase shifter according to claim 1, wherein the sectional shape of each of the first electrode and the second electrode along the corresponding thickness direction has a chamfer between the side edge and a top edge of the sectional shape.

4. The tunable phase shifter according to claim 3, wherein a capacitance value of the variable capacitor is given by:

$$C_1 = \frac{\varepsilon_0 \varepsilon_r \times L \times (L_1 + L_2')/2}{(D_1 + D_2)/2};$$

wherein $C_1$ indicates the capacitance value of the variable capacitor;

$\varepsilon_0$ indicates a vacuum dielectric constant;

$\varepsilon_r$ indicates a relative dielectric constant;

L indicates an extension length of the first electrode and the second electrode;

$L_1$ indicates a length of the top edge of the sectional shape of the first electrode and the second electrode along the corresponding thickness direction;

$L_2'$ indicates a length of the bottom edge of the sectional shape of the first electrode and the second electrode along the corresponding thickness direction;

$D_1$ indicates a distance between the top edge of the sectional shape of the first electrode along the corresponding thickness direction and the top edge of the sectional shape of the second electrode along the corresponding thickness direction in the overlapping area; and $D_2$ indicates a distance between the bottom edge of the sectional shape of the first electrode along the corresponding thickness direction and the bottom edge of the sectional shape of the second electrode along the corresponding thickness direction in the overlapping area.

5. The tunable phase shifter according to claim 4, wherein the first electrode comprises a first signal electrode and a second signal electrode spaced from each other, and the second electrode comprises a first patch electrode attached to a side of the second substrate facing the variable dielectric layer;

wherein orthographic projections of the first signal electrode and the second signal electrode on the first substrate both at least partially overlap with an orthographic projection of the first patch electrode on the first substrate, forming the variable capacitor.

6. The tunable phase shifter according to claim 5, wherein the first electrode comprises multiple first grounding electrodes arranged at intervals;

each of the first grounding electrodes is coupled to a second grounding electrode on a side of the first substrate facing away from the variable dielectric layer via a through hole penetrating through the first substrate in a thickness direction of the first substrate;

an orthographic projection of each of the first grounding electrodes on the first substrate falls completely within a range of an orthographic projection of the second grounding electrode on the first substrate; and the orthographic projection of each of the first grounding electrodes on the first substrate at least partially overlaps with an orthographic projection of the first patch electrode on the first substrate, forming the variable capacitor.

7. The tunable phase shifter according to claim 4, wherein the first electrode comprises a first body part extending along a first direction and multiple first branch parts connected with the first body part and extending along a second direction intersecting the first direction; and the second electrode comprises a second body part extending along the first direction and multiple second branch parts connected with the second body part and extending along the second direction;

wherein the first branch parts at least partially overlap with corresponding second branch parts, forming the variable capacitor.

8. The tunable phase shifter according to claim 4, wherein the first electrode comprises multiple third grounding electrodes arranged at intervals and a third signal electrode between adjacent third grounding electrodes; and the second electrode comprises multiple second patch electrodes arranged at intervals;

wherein orthographic projections of each of the third grounding electrodes and the third signal electrode on the first substrate at least partially overlap with an orthographic projection of a corresponding second patch electrode on the first substrate, forming the variable capacitor.

9. The tunable phase shifter according to claim 4, wherein the first electrode comprises a fourth grounding electrode and a fourth signal electrode, wherein the fourth grounding electrode comprises a first sub-grounding electrode and a second sub-grounding electrode spaced from each other; the fourth signal electrode is located between the first sub-grounding electrode and the second sub-grounding electrode; and the second electrode comprises multiple third patch electrodes arranged at intervals;

wherein the fourth signal electrode comprises a third body part extending along a third direction and multiple third branch parts connected with the third body part and extending along a fourth direction intersecting the third direction;

the first sub-grounding electrode comprises a fourth body part extending along the third direction and multiple fourth branch parts connected with the fourth body part and extending along the fourth direction; and the second sub-grounding electrode comprises a fifth body part extending along the third direction and multiple fifth branch parts connected with the fifth body part and extending along the fourth direction;

wherein an orthographic projection of each of the third patch electrodes on the first substrate at least partially overlaps with orthographic projections of corresponding third branch parts, fourth branch parts, and fifth branch parts on the first substrate, forming the variable capacitor.

10. The tunable phase shifter according to claim 4, wherein the first electrode comprises multiple fifth grounding electrodes arranged at intervals and a fifth signal electrode between adjacent fifth grounding electrodes; and the second electrode comprises a fourth patch electrode attached to the side of the second substrate facing the variable dielectric layer;

wherein orthographic projections of each of the fifth grounding electrodes and the fifth signal electrode on the first substrate at least partially overlap with an orthographic projection of the fourth patch electrode on the first substrate, forming the variable capacitor.

11. A method of manufacturing the tunable phase shifter according to claim 1, comprising:

forming a pattern of the first electrode on a side of the first substrate and forming a pattern of the second electrode on a side of the second substrate, via an electroplating process; and forming the variable dielectric layer between the first substrate and the second substrate in such a way that the overlapping area of the first electrode and the second electrode forms the variable capacitor.

12. The method according to claim 11, wherein the forming the pattern of the first electrode on the side of the first substrate via the electroplating process, comprises:

depositing a first seed layer on the side of the first substrate across the entire side;

forming a first metal film layer on a side of the first seed layer away from the first substrate across the entire side via the electroplating process; and forming the pattern of the first electrode by etching the first seed layer and the first metal film layer via a patterning process.

13. The method according to claim 11, wherein the forming the pattern of the second electrode on the side of the second substrate via the electroplating process, comprises:

depositing a second seed layer on the side of the second substrate across the entire side;

forming a second metal film layer on a side of the second seed layer away from the second substrate across the entire side via the electroplating process; and forming the pattern of the second electrode by etching the second seed layer and the second metal film layer via a patterning process.

14. An electronic device, comprising:

a tunable phase shifter, a radiating antenna, a power divider network, and a feeding network arranged in an array, wherein the tunable phase shifter comprises:

a first substrate and a second substrate arranged opposite to each other;

a variable dielectric layer between the first substrate and the second substrate;

a first electrode on a side of the first substrate facing the variable dielectric layer; and a second electrode on a side of the second substrate facing the variable dielectric layer, wherein an overlapping area of the first electrode and the second electrode forms a variable capacitor;

wherein, in a direction facing away from the first substrate, a sectional area of the first electrode along a plane parallel to a plane of the first substrate decreases; and in a direction facing away from the second substrate, a sectional area of the second electrode along a plane parallel to a plane of the second substrate decreases;

wherein a side edge of a sectional shape of each of the first electrode and the second electrode along a corresponding thickness direction is arc-shaped and is concave toward a central position of the sectional shape.

* * * * *